E. W. DUSTON.
CUTTING OFF AND CARRYING MECHANISM FOR HEADING MACHINES.
APPLICATION FILED JAN. 18, 1911.
1,015,382.
Patented Jan. 23, 1912.
2 SHEETS—SHEET 2.
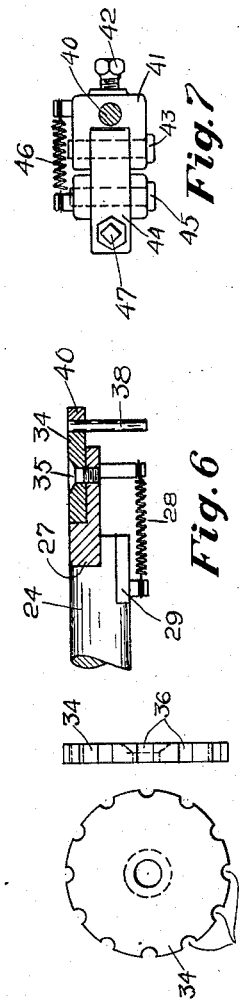
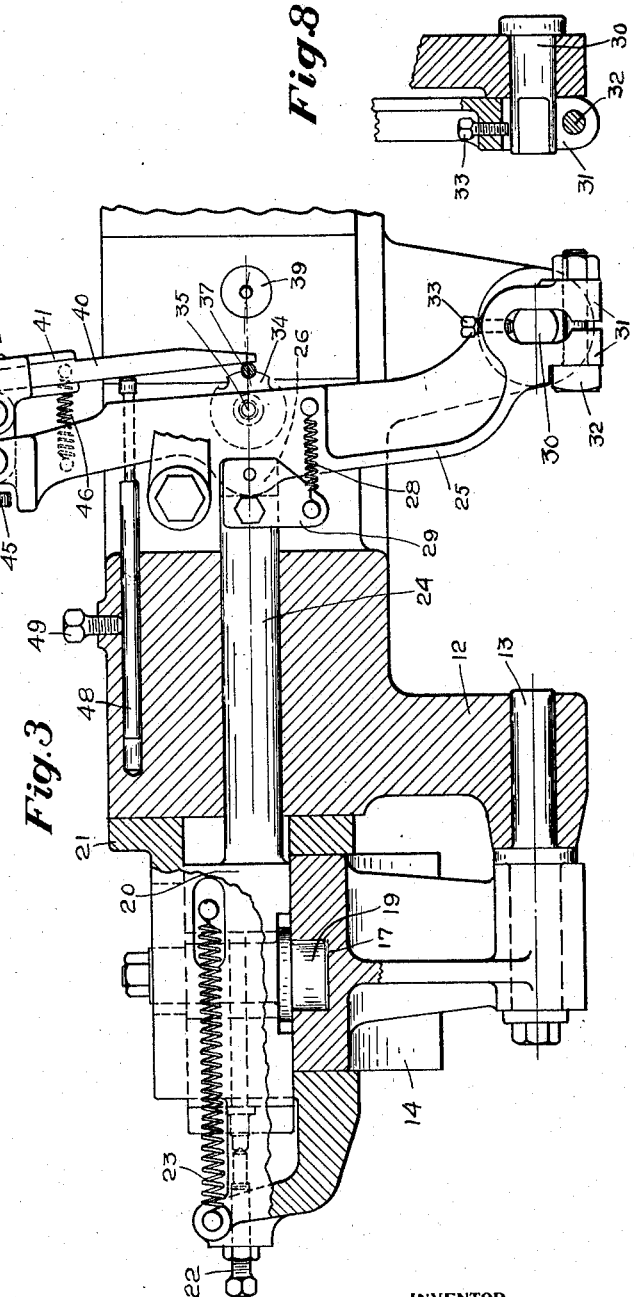
WITNESSES
INVENTOR
Ernest W. Duston
BY
ATTORNEY

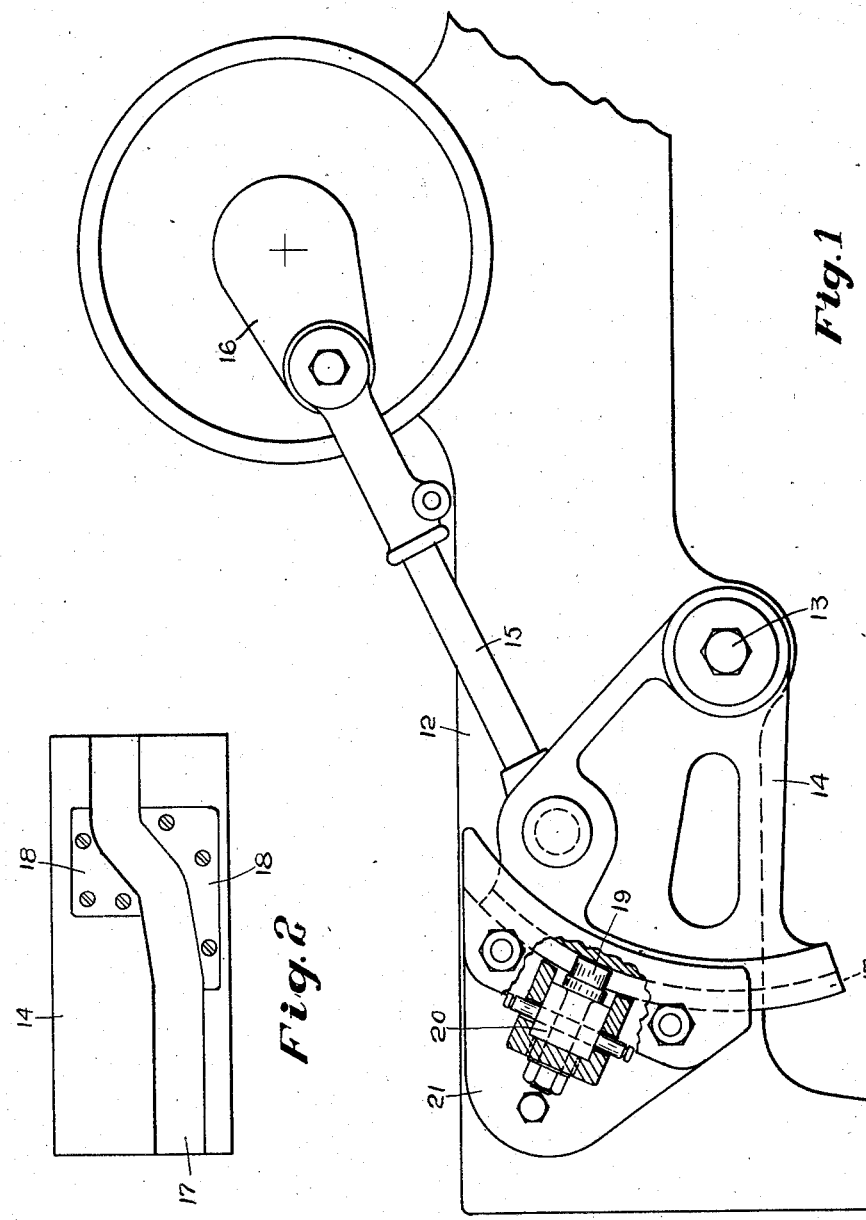

UNITED STATES PATENT OFFICE.

ERNEST W. DUSTON, OF WATERBURY, CONNECTICUT, ASSIGNOR TO THE BLAKE AND JOHNSON COMPANY, OF WATERBURY, CONNECTICUT, A CORPORATION OF CONNECTICUT.

CUTTING-OFF AND CARRYING MECHANISM FOR HEADING-MACHINES.

1,015,382.  Specification of Letters Patent.  Patented Jan. 23, 1912.

Application filed January 18, 1911. Serial No. 603,292.

*To all whom it may concern:*

Be it known that I, ERNEST W. DUSTON, a citizen of the United States, residing at Waterbury, county of New Haven, State of Connecticut, have invented an Improvement in Cutting-Off and Carrying Mechanism for Heading-Machines, of which the following is a specification.

This invention relates to machines for making bolts, screws, and similar articles and has reference more particularly to the mechanism for cutting off a blank, from which the bolt or the like is to be made, from the strip of material supplied to the machine and for carrying said blank to the mechanism for forming a head thereon.

The principal objects of the invention are to provide mechanism of this character which will be relatively simple and inexpensive of construction, reliable in operation, and whose parts may be easily adjusted or replaced in case of wear or breakage.

With these and other objects in view I have devised the novel mechanism shown in the accompanying drawing forming a part of this specification and in which, Figure 1 is a side elevation, partly broken away, of the cutting off and carrying mechanism of a bolt heading machine; Fig. 2 is a development of the surface of the operating segment; Fig. 3 is a detail elevation, partly in section transverse to Fig. 1, of the cutting off and carrying mechanism; Figs. 4 and 5 are face and edge views respectively of the cutter; Fig. 6 is an end view of the cutter operating rod showing the cutter carrier and cutter in section; Fig. 7 is an end view of the cutter carrier and holding lever; Fig. 8 is a detail sectional view of the mounting for the cutter carrying lever.

12 denotes the frame of a bolt heading machine and 13 a stud projecting therefrom upon which is pivoted an oscillatory operating segment 14 connected by a pitman 15 with a crank 16 on the main shaft of the machine. The face of the segment 14 is provided with a cam groove 17 which is substantially of the form shown in Fig. 2 and portions of which may, if desired, be formed by detachable hardened plates 18.

19 denotes a stud projecting from a reciprocatory slide 20 and entering the cam groove 17. The slide 20 is guided in a bracket 21 secured to the machine frame, said bracket also providing guides for segment 14.

22 denotes stop screws for slide 20 and 23 springs connecting said slide with the outer end of bracket 21.

The guides for segment 14 are disconnected at their ends while the cam groove 17 in the segment extends to the ends of said segment. If, therefore, access to the working face of the segment is desired as, for example, for the purpose of making repairs, it is only necessary to disconnect the pitman 15 and swing the segment upwardly or downwardly out of its guides, the stud 19 at this time passing out of the end of the groove 17.

The slide 20 is provided with a rod 24 which is guided in the frame and engages at its inner end the cutter carrier, 25. Said cutter carrier is shown in the form of a lever having a portion 26 loosely engaged by a notch 27 in the end of the rod 24.

28 denotes a spring connected at one end to the cutter carrying lever 25 and at its other end to a plate 29 secured to the rod 24.

30 denotes a stud shaft projecting from the machine frame and having its outer end flattened as shown in Figs. 3 and 8. The end of the lever 25 is bifurcated, forming arms 31 of greater length than the thickness of the shaft 30 and which embrace the flattened end thereof and are clamped thereto by means of a bolt 32.

33 denotes an adjusting screw carried by the lever 25 and engaging the stud shaft 30 to fix the relative position of said lever and shaft. The construction described provides an adjustable and detachable mounting for the lever 25, whereby this lever may be adjusted to bring the cutter into proper position or may be removed in order to afford convenient access to the cutter, or for other purposes.

34 denotes the cutter carried by the lever 25. This cutter, in accordance with the present invention, is made in the form of a disk pivoted at 35 to the lever 25 and having around its periphery a series of notches 36 of a form and size corresponding approximately to the sectional configuration of the material operated upon. The construction shown provides a very convenient and economical form of cutter. These cutters can be made very cheaply by cutting sections from a cylinder having grooves milled therein to provide the notches 36. The cutter when in position on the lever 25 may be turned on its pivot to bring any one of the notches 36 into operative position, and when worn can be resharpened to provide new cutting edges on all of the notches 36 merely by grinding one of its lateral faces.

It will be understood that in the operation of the machine the material to be cut into blanks is fed to the cutter when the parts are in the position shown in Fig. 3, the position of the stock being indicated by the numeral 37 in said figure. Thereafter upon oscillation of the segment 14 the slide 20 is moved toward the right in Fig. 3, carrying with it the rod 24 and cutter carrier 25, thereby causing the cutter 34 to shear off a blank, designated by the numeral 38 in Fig. 6, and carry the same to the die 39, where it is held for the action of the heading punch (not shown). In order that the lever 25 may serve as a carrier for the blank after the same has been cut off, it is necessary that this blank be secured to the cutter 34 during the carrying movement of the lever 25. In accordance with the present invention the following improved means have been provided for this purpose.

40 denotes a finger coöperating with the cutter 34 to clamp the blank, said finger being slidably mounted in a socket 41 and held in adjusted position therein by means of a set screw 42. The finger 40 and socket member 41 together constitute a holding lever pivoted at 43 to a link 44, which in turn is pivoted at 45 to the cutter carrier 25.

46 denotes a spring connecting the socket member 41 with the lever 25 and tending normally to draw the finger 40 toward the cutter 34.

47 denotes a stop screw carried by the link 44 and adapted to engage the lever 25 to limit the movement of said link about its pivot 45.

48 denotes a rod slidably mounted in the machine frame and held in adjusted position by a set screw 49, said rod serving as a stop to move the finger 40 away from the cutter 34 as the lever 25 approaches its initial position as shown in Fig. 3.

The operation of the mechanism is as follows. The parts being in the position shown in Fig. 3 the stock 37 is fed into the machine by any suitable means and the lever 25 moved to the right to shear off a blank 38 as above described. The spring 46 causes the finger 40 to clamp this blank to the cutter 34, so that said blank is carried with the cutter to a position opposite the die 39. The heading punch is thereupon advanced, causing the blank to be forced into the die and held therein. The heading punch and the other features of the heading mechanism are not herein shown as they form no part of the present invention and are familiar to those skilled in the art. Upon the return movement of the cutter carrier 25 the spring 46 will yield to permit the finger 40 to slip over the blank which is now held by the die. The link connection 44 between the holding lever and the lever 25 is provided in order to permit the finger 40 to rise at this time, thereby releasing the blank more quickly and surely. As the lever 25 approaches its initial position the finger 40 is engaged by the end of the rod 48 and held thereby away from the cutter 34 in order to permit a new length of stock to be fed between said finger and cutter.

Having thus described my invention I claim:

1. The combination with a cutter carrier and an actuator therefor provided with a stud, of a pivoted segment having a cam groove to receive said stud, said cam groove being extended to the ends of said segment, and means to oscillate said segment.

2. The combination with a cutter carrier and an actuator therefor provided with a stud, of a pivoted segment having a cam groove to receive said stud, said cam groove being extended to the ends of said segment, guides for said segment having open ends to permit said segment to be swung into and out of said guides, and means to oscillate said segment.

3. The combination with a frame and a die supported by said frame, of mechanism for cutting blanks from stock and delivering the same to said die, said mechanism including a cutter carrying lever, means for adjustably mounting said lever in said frame, and actuating means for said lever including a rod having its end in loose engagement with said lever.

4. The combination with a die, of mechanism for cutting blanks from stock and delivering the same to said die, said mechanism including a stud shaft having a flattened end, a cutter carrying lever having a bifurcated end forming arms embracing the flat end of the stud shaft, the opening between the arms being of greater length than the diameter of the shaft, and a bolt engaging the said arms for adjustably clamping the shaft between them.

5. The combination with a die, of mechanism for cutting blanks from stock and delivering the same to said die, said mechanism including a stud shaft, a cutter carrying lever adjustably mounted on said shaft, and an adjusting screw carried by said lever and engaging said shaft to fix the position of said lever on said shaft.

6. The combination with a die, of mechanism for cutting blanks from stock and delivering the same to said die, said mechanism including a cutter carrier having a cutter, a lever pivotally connected with said cutter carrier, and a spring for normally holding said lever in engagement with said cutter.

7. The combination with a die, of mechanism for cutting blanks from stock and delivering the same to said die, said mechanism including a cutter carrier having a cutter, a socket member pivotally connected with said cutter carrier, a finger adjustably secured in said socket, and a spring for normally drawing said finger toward said cutter.

8. The combination with a die, of mechanism for cutting blanks from stock and delivering the same to said die, said mechanism including a cutter carrier having a cutter, a lever, a link pivotally connected to said lever and said cutter carrier, and a spring for normally drawing said lever toward said cutter.

9. The combination with a die, of mechanism for cutting blanks from stock and delivering the same to said die, said mechanism including a cutter carrier having a cutter, a lever, a link pivotally connected to said lever and said cutter carrier, a stop for limiting the movement of said link with respect to said cutter carrier, and a spring for normally drawing said lever toward said cutter.

10. The combination with a die, of mechanism for cutting blanks from stock and delivering the same to said die, said mechanism including a cutter carrier having a cutter, a lever pivotally connected with said cutter carrier, a spring for normally drawing said lever toward said cutter, and a stop adapted to engage said lever as said cutter carrier approaches the limit of its movement away from said die to move said lever away from said cutter.

11. The combination with a die, of mechanism for cutting blanks from stock and delivering the same to said die, said mechanism including a cutter carrier having a cutter, a lever pivotally connected with said cutter carrier, a spring for normally drawing said lever toward said cutter, and an adjustable stop adapted to engage said lever as said cutter carrier approaches the limit of its movement away from said die to move said lever away from said cutter.

12. The combination with a die, of mechanism for cutting blanks from stock and delivering the same to said die, said mechanism including a cutter carrier having a cutter, a lever pivotally connected with said cutter carrier, a spring for normally forcing said lever toward said cutter, an adjustably mounted rod arranged with its end in a position to engage said lever as said cutter carrier approaches the limit of its movement away from said die to move said lever away from said cutter, and means for holding said rod in adjusted position.

In testimony whereof I affix my signature in presence of two witnesses.

ERNEST W. DUSTON.

Witnesses:
  LANCASTER P. CLARK,
  GEO. A. EDWARDS.

---

Copies of this patent may be obtained for five cents each, by addressing the "Commissioner of Patents, Washington, D. C."